United States Patent [19]

Reel et al.

[11] 4,342,683
[45] Aug. 3, 1982

[54] AZO DYES WITH CARBOXYL POLYALKYLENEOXY CHAIN MOIETY

[75] Inventors: Henning Reel, Cologne; Winfried Kruckenberg; Karl H. Schündehütte, both of Leverkusen, all of Fed. Rep. of Germany

[73] Assignee: Bayer Aktiengesellschaft, Leverkusen, Fed. Rep. of Germany

[21] Appl. No.: 196,519

[22] Filed: Jul. 2, 1980

Related U.S. Application Data

[63] Continuation of Ser. No. 967,431, Dec. 7, 1978, abandoned.

[30] Foreign Application Priority Data

Dec. 9, 1977 [DE] Fed. Rep. of Germany ....... 2755022

[51] Int. Cl.³ .............................................. C09B 29/36
[52] U.S. Cl. .................................... 260/156; 260/154; 260/155; 260/162; 260/163; 260/165
[58] Field of Search ........................................ 260/156

[56] References Cited

U.S. PATENT DOCUMENTS

| | | | |
|---|---|---|---|
| 3,640,674 | 2/1972 | Berrie et al. | 260/156 |
| 3,884,899 | 5/1975 | Lindley et al. | 260/156 |
| 3,923,776 | 12/1979 | Gnad | 260/156 |
| 4,091,025 | 5/1978 | Schlesinger et al. | 260/156 |
| 4,133,806 | 1/1979 | Gnad | 260/156 |
| 4,140,684 | 2/1979 | Burkhard et al. | 260/156 |
| 4,146,535 | 3/1979 | Dehnert et al. | 260/156 |

Primary Examiner—John F. Niebling
Attorney, Agent, or Firm—Sprung, Horn, Kramer & Woods

[57] ABSTRACT

Azo dyestuffs of the formula

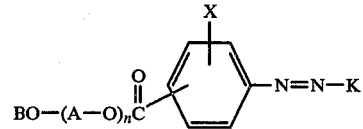

wherein
X denotes hydrogen, nitro or $COOR_1$,
B denotes R or acyl,
R denotes hydrogen or a hydrocarbon,
$R_1$ denotes alkyl or cycloalkyl,
A denotes alkylene,
n denotes the numbers 3–8 and
K denotes a coupling component of the pyrazole, pyridine, indole or pyrimidine series, are outstandingly suitable for dyeing synthetic fibre materials, especially made of polyesters, on which they produce dyeings with good fastness to sublimation, washing and light.

It is particularly advantageous to use the dyestuffs in the form of preparations which, in addition to the dyestuff, contain emulsifiers, since in a dyebath these are present in the liquid form and therefore do not require the addition of carriers.

8 Claims, No Drawings

AZO DYES WITH CARBOXYL POLYALKYLENEOXY CHAIN MOIETY

This is a continuation of application Ser. No. 967,431, filed Dec. 7, 1978, now abandoned.

The invention relates to azo dyestuffs of the formula

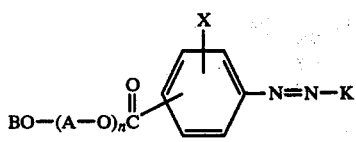
(I)

wherein
X denotes hydrogen, nitro or $COOR_1$,
B denotes R or acyl,
R denotes hydrogen, alkyl, cycloalkyl, alkenyl, aryl or aralkyl,
$R_1$ denotes alkyl or cycloalkyl,
A denotes alkylene,
n denotes the numbers 3–8 and
K denotes a coupling component from the series

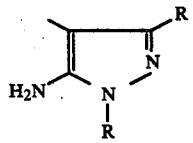 (a)

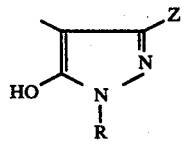 (b)

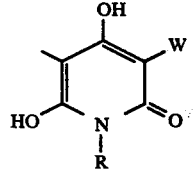 (c)

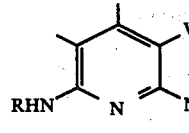 (d)

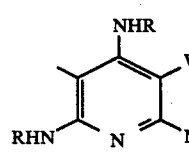 (e)

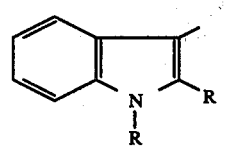 (f)

-continued

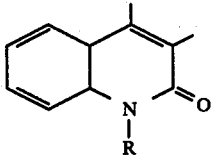 (g)

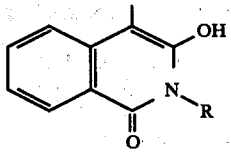 (h)

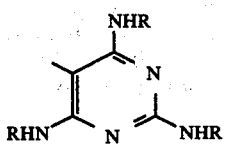 (i)

or

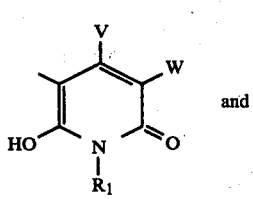 (k)

and

R—independently of one another—has the abovementioned meaning,
Z represents R, COOR or CONRR,
V represents hydrogen or alkyl and
W represents CN, COOR or CONRR, and the alkyl, cycloalkyl, alkenyl, aryl, alkylene and acyl radicals mentioned above in any context can contain further non-ionic substituents customary in azo chemistry or can contain the radical COOH, and X represents hydrogen when K represents the radicals (f) or (h), as well as their preparation and use.

Suitable alkylene radicals A are $-(CH_2)_2-$, $-(CH_2)_3-$, $-(CH_2)_4-$, $-C(CH_3)H-CH_2-$ or $-CH_2-C(OH)H-CH_2-$, $-C_2H_4-$ being preferred.

Suitable alkyl radicals are those having 1–4 C atoms, which can optionally be substituted by a radical —OH, $C_1$-$C_4$-alkoxy, —CN, —Cl or —Br. The methyl radical is preferred. The alkyl radicals can also form a heterocyclic structure—optionally via a common S or N atom, for example

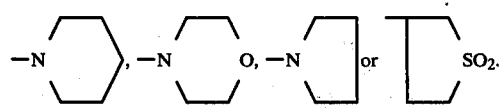

Suitable cycloalkyl is cyclohexyl.

Suitable alkenyl is allyl. Suitable aralkyl is benzyl, phenylethyl and phenylpropyl. Suitable acyl radicals are $C_1$-$C_4$-alkylcarbonyl radicals or arylcarbonyl radicals.

Suitable aryl is phenyl, which can be monosubstituted to trisubstituted by —$CH_3$, —Cl, —Br, —$OCH_3$, —$OC_2H_5$ or —$CF_3$ or substituted by one —$NO_2$.

Suitable non-ionic substituents are $C_1$-$C_4$-alkyl, F, Cl, Br, $CF_3$, $NO_2$, CN, O—$C_1$—$C_4$-alkyl and others. $CH_3$, Cl, Br, $NO_2$, CN and $OCH_3$ are preferred.

The radical

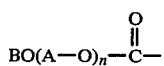

is preferably in the orthoposition or para-position relative to the azo group.

Bulky radicals such as, for example, tert.-butyl, are in those positions where they do not effect any steric hindrance.

n preferably represents the numbers 3–6.

Preferred dyestuffs according to the invention are those containing coupling components of the formulae (a), (b), (d), (f) and (k), and above all (c) and (e).

Particularly preferred dyestuffs correspond to the formula

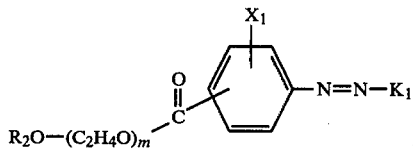

(II)

wherein
m denotes the numbers 3–6,
$R_2$ denotes hydrogen or $C_1$-$C_4$-alkyl,
$X_1$ denotes hydrogen or —$NO_2$ and
$K_1$ denotes a coupling component from the series

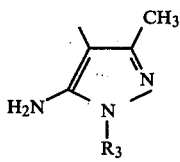 (a')

 (b')

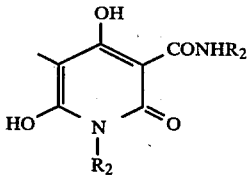 (c')

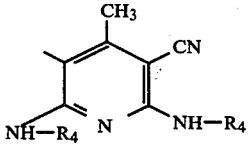 (d')

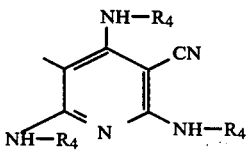 (e')

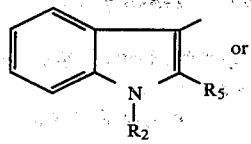 (f')

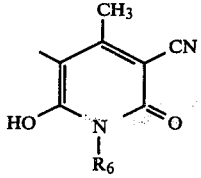 (k')

and
$R_3$ denotes Ar, $C_1$-$C_4$-alkyl, —$C_2H_4$—CN or

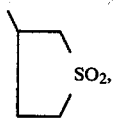

Ar denotes phenyl which is optionally monosubstituted to trisubstituted by $CH_3$, Cl, Br or $OCH_3$,
$Z_1$ denotes $CH_3$, —$COOR_2$ or —$CONHR_2$,
$R_4$ denotes $R_2$ or $C_1$-$C_4$-alkyl which is optionally substituted by OH, $C_1$-$C_4$-alkoxy, phenyl or phenoxy,
$R_5$ denotes $R_2$ or Ar and
$R_6$ denotes $C_1$-$C_4$ alkyl, the radicals $R_2O$—$(C_2H_4O)_m$—CO— and $X_1$ being in the ortho-position or para-position relative to the azo group and $X_1$ being hydrogen when $K_1$ represents the radical (f').

Dyestuffs of the formula (II) in which $X_1$ represents hydrogen are very particularly preferred.

Amongst the latter, in turn, preferred dyestuffs are those of the formula

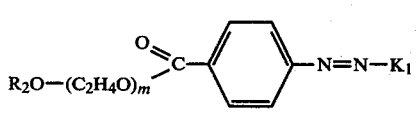

(III)

wherein
m, $R_2$ and $K_1$ have the abovementioned meaning and $K_1$ preferably represents (b'), (c') or (e').

The new dyestuffs are obtained, for example, when diazotised amines of the formula

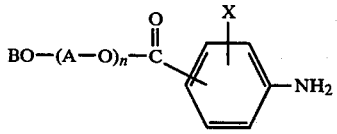

(IV)

in which B, A, n and X have the abovementioned meaning, are coupled in a manner which is in itself known with coupling components of the formula

H-K (V)

wherein K has the abovementioned meaning.

Some of the compounds of the formula (IV) are known (compare DOS (German Published Specifications) 1,655,063, 2,157,229, 2,147,759, 2,252,943 and 2,260,151 and U.S. Pat. No. 3,154,534 and British Pat. No. 996,068).

The compounds of the formula (IV) which have not been described hitherto are, however, readily accessible by methods which are in themselves known, by, for example, reacting compounds of the formula

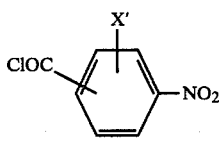
(VI)

wherein

X′=COCl, CO₂R₁ or H, with polyalkylenols of the formula

(VII)

and subsequently reducing the nitro group to the amino group.

A further process for the preparation of diazo components which have not been described hitherto comprises reacting the compound of the formula

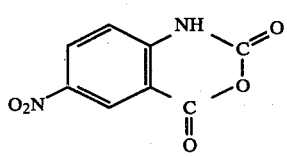

with compounds of the formula (VII) in a manner which is in itself known.

Diazo components to be employed according to the invention which have a nitro group in the ortho-position relative to the amino group are appropriately obtained by acid-catalysed esterification of 3-nitro-4-aminobenzoic acid with compounds of the formula (VII), the water of reaction being separated off by distillation at the same time.

The compounds of the formula (VII) do not necessarily have to be employed in the form of the pure single compounds. For reasons of economy and application technology, it is frequently even advantageous to employ the statistical mixtures of the oxalkylation products of suitable OH compounds after separating off the mono- and di-oxalkylation products beforehand, by distillation, if necessary.

The coupling components of the formula (V) have, in most cases, also been described in the literature (compare, for example, DOS (German Published Specifications) 2,263,007, 2,162,179, 2,255,910 and 1,644,063), or they are obtainable by the methods of preparation indicated in the literature.

The new dyestuffs are outstandingly suitable for dyeing and printing synthetic fibre materials, especially those made of aromatic polyesters and cellulose esters, on which they produce dyeings with good general fastness properties, in particular good fastness to sublimation, washing and light.

It is particularly advantageous to employ the dyestuffs in the form of liquid or pulverulent preparations which, in addition to the dyestuff, contain emulsifying polar/apolar compounds and also, optionally, formulating agents and extenders (especially inorganic salts, such as NaCl and Na₂SO₄).

In general, a molar ratio of dyestuff to emulsifier such as 1:0.1 to 1:4 has proved advantageous; a ratio of 1:1 is preferred and in general an excess of emulsifier does no harm. In practice, however, a two-fold excess will generally be completely adequate.

There are no specifically requirements in respect of apparatus which have to be met when producing the dye preparations. Spray drying, drum drying or drying in Venuleth apparatuses are equally as suitable as simple drying on sheet metal, after combining the components, in normal kettles, or the combination of adduct formation and drying in the abovementioned apparatuses. It is particularly advantageous to mix the filter cake or the oily or pasty dyestuff, which is obtained direct from the preparation, with the emulsifiers and to convert the mixture, if desired, to the dry pulverulent form in a known manner. In this context, a fact to be singled out is that if comminution of the dyestuff/emulsifier mixture is carried out, no expensive fine-comminution equipment, such as bead mills or vibratory mills, has to be employed, but coarse grinding down to average particle sizes which are not below 50μ is completely adequate.

A list of suitable emulsifiers can be taken from Table 1 in "Tenside Detergents", year November 1974, No. 4, page 186.

Preferred polar/apolar compounds correspond to the general formula

G-L   (IX)

wherein
  G represents an aliphatic hydrocarbon radical having at least 10 C atoms and
  L represents —SO₃H, —O—SO₃H or OPO₃H₂ or the corresponding salts.

Examples which may be mentioned are: fatty acid soaps, such as sodium laurate, sodium oleate, sodium linoleate, ammonium ricinoleate, oleic acid esters of sodium isethionate or sodium palmitate, sodium bis-(2-ethylhexyl)sulphonesuccinate, sodium N-methyl-N-oleyl taurate, β-(tert.-octylphenoxy)-diethyl ether-β′-Na sulphonate, sodium isododecylbenzenesulphonate, sodium dodecyl-sulphate, sodium N-oleylsulphanilate, dodecyl-phosphonic acid, sodium dodecylbenzimidazolesulphanate/alkoxyaryl sulphates, alkylsulphaminoaryl compounds, dodecylphenol sulphate, dodecylbenzenesulphamic acid, dibutylnaphthol sulphate and dioctylnaphthol sulphate. Cationic surface-active agents which may be mentioned are dodecylamine acetate, dodecylbenzyldimethylammonium chloride and (n-heptadecyl-N-aminoethyl)imidazoline acetate. Non-ionic surface-active agents are polyethylene glycol monododecyl ether, polyethylene glycol mono-(isooctyl)-phenyl ether, polyethylene glycol monooleic acid ester and sorbitol mono-stearic acid ester polyglycol ether.

Under dyeing or printing conditions, the new dye preparations are in a liquid or dissolved form. As a result of this, the use of additional surface-active agents, such as dispersing agents, protective colloids and levelling agents, or of carriers is superfluous in most cases when dyeing and printing.

In the examples which follow, "parts" denote parts by weight.

EXAMPLE 1

37.1 parts of p-aminobenzoic acid methylpentaglycol ester are dissolved in 60 parts of water and 30 parts of concentrated hydrochloric acid and, after adding 100 parts of ice, diazotised at 0°–3° C. by the dropwise addition of one equivalent of 30% strength NaNO₂ solution. A little amidosulphonic acid and 10 parts of kieselguhr are then added and the mixture is clarified.

19.8 parts of 1-methyl-4,6-dihydroxypyrid-2-one-3-carboxylic acid methylamide are dissolved, at pH 7–8, in 600 parts of water with the addition of 40% strength sodium hydroxide solution. The solution is cooled to 3°–8° C. by adding about 200 parts of ice and the above diazotisation mixture is allowed to run into this solution. During the addition, the pH value is kept at pH 5 by adding 40% strength sodium hydroxide solution dropwise at the same time.

100 parts of NaCl and then added to the pasty suspension, the mixture is heated slowly to 60°–65° C. by passing in steam and is stirred for 2 hours at this temperature and the product is filtered off hot. This gives about 140 parts of a coarse-grained filter cake which contains 55 parts of pure dyestuff (95% of theory) of the formula:

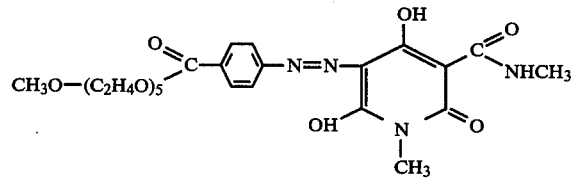

The above filter cake is homogenised well together with 55 parts of $C_{12}H_{25}$—$OSO_3Na$ emulsifier, 22 parts of $Na_2SO_4$ and 330 parts of water, by stirring vigorously. This suspension is spray-dried. This gives a yellow powder which has the composition: about 40% of pure dyestuff, 40% of emulsifier and 20% of $Na_2SO_4$/NaCl; and dyes, for example, polyester materials by the normal exhaustion process, with about 95% exhaustion of the bath, in brilliant greenish-tinged yellow shades of outstanding fastness to washing, sublimation and light and can also be employed for printing processes with similarly good results.

The p-aminobenzoic acid methylpentaglycol ester employed in this example can be obtained, for example, by reacting methanol (or methylglycol) with 5 (or 4) equivalents of ethylene oxide in a closed vessel under alkaline catalysis at somewhat elevated temperature, reacting the resulting statistical mixture of methylpolyglycols, the average molecular weight of which corresponds to that of a methylpentaglycol, with one equivalent of p-nitrobenzoic acid chloride to give the corresponding ester and then converting the nitro group to the amino group, for example by catalytic hydrogenation.

EXAMPLE 2

32.7 parts of p-aminobenzoic acid methyltetraglycol ester are dissolved in 60 parts of water and 30 parts of concentrated HCl and, after adding 100 parts of ice, diazotised at 0°–3° C. by means of one equivalent of 30% strength NaNO₂ solution. A little amidosulphonic acid and 10 parts of cellite are then added and the mixture is clarified.

This diazotisation mixture is allowed to run, at 3°–8° C., into 24 parts of 2-(β-methoxyethylamino)-3-cyano-4,6-bis-(methylamino)-pyridine, dissolved in about 60 parts of glacial acetic acid/60 parts of water, and the pH value is then adjusted to pH 5 by adding 40% strength sodium hydroxide solution dropwise: the dyestuff of the formula

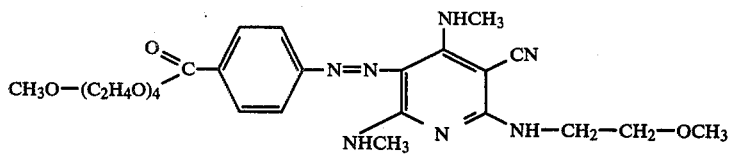

which has formed in about 95% yield, is partly in the form of a solution and partly in the form of an oil of low viscosity.

300 parts of n-butanol and 30 parts of NaCl are now added to this mixture and the whole is stirred vigorously for about 15 minutes. After switching off the stirrer, complete phase separation takes place within 2–3 minutes: the aqueous phase, which is only slightly yellow-coloured, is run off at the bottom and discarded, and the butanol phase, which contains the dyestuff, is transferred to a distillation flask and the n-butanol is distilled off under a waterpump vacuum.

The dyestuff (54 parts), which remains as a dark brown viscous oil is homogenised with 54 parts of $C_{12}H_{25}O$—$SO_3Na$, 25 parts of $Na_2SO_4$ and 280 parts of water and spray-dried. This gives a yellow powder which has the composition: about 40% of dyestuff, 40% of emulsifier and 20% of $Na_2SO_4$/NaCl, and dyes, for example, polyester materials by the exhaustion process, with about 96% exhaustion of the bath, in brilliant yellow shades of outstanding fastness to washing, sublimation and light and can also be employed for printing processes with equally good results.

A liquid formulation of the dyestuff which is outstandingly suitable for the preparation of printing pastes is also obtained by dissolving the dyestuff oil, which remains after distilling off the n-butanol, in approximately the same amount of a higher-boiling organic solvent, such as, for example, glycol or propylene glycol.

EXAMPLE 3

32.7 parts of p-aminobenzoic acid methyltetraglycol ester are diazotised as described in Example 2. This solution is allowed to run, at 3°–8° C., into a solution of 18 parts of 1-phenyl-3-methylpyrazol-5-one in 200 parts of water/9 parts of 47% strength sodium hydroxide solution/150 parts of ice, the resulting mixture is stirred for a further 30 minutes and the pH is then adjusted to 6 with hydrochloric acid.

The dyestuff which has precipitated out is then filtered off and washed with about 100 parts of water.

The moist filter cake, which contains about 49 parts (96% of theory) of pure dyestuff of the formula

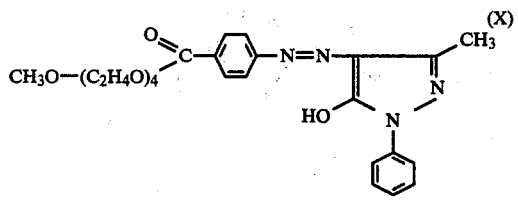

is mixed to a paste with 49 parts of $C_{12}H_{25}O-SO_3Na$ and 49 parts of $Na_2SO_4$ and the paste is made up to a total weight of about 500 parts with water. This gives a pourable homogeneous paste and spray-drying of the latter gives a yellow powder which has the composition: about 33% of dyestuff, 33% of $C_{12}H_{25}-OSO_3Na$ and 33% of $Na_2SO_4$, and dyes, for example, polyester materials by the exhaustion process, with about 96% exhaustion of the bath, in greenish-tinged yellow shades of outstanding fastness to washing, sublimation and light and can also be used for printing processes with similarly good results.

EXAMPLE 4

37.4 parts of 5-nitro-2-amino-benzoic acid methyltetraglycol ester are diazotised in aqueous-hydrochloric acid solution at 3°–8° C. by adding one equivalent of 30% strength $NaNO_2$ solution.

After clarifying by means of alumina, this diazotisation mixture is allowed to run into a cooled solution of 24 parts of 2-(β-methoxyethylamino)-3-cyano-4,6-bis(-methylamino)-pyridine in 60 parts of glacial acetic acid and 60 parts of water, 40% strength sodium hydroxide solution is added dropwise until the pH is 5 and the mixture is then stirred for about a further 30 minutes.

About 100 parts of NaCl are then added, the mixture is warmed to 50°–60° C. for 2 hours and the dyestuff of the formula (XI) is isolated by filtration.

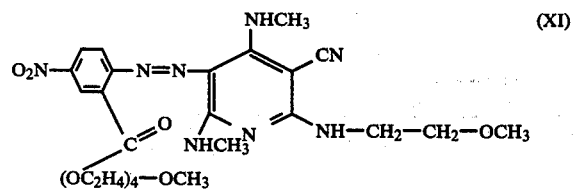

29 parts of $C_{12}H_{25}OSO_3Na$, 29 parts of $C_{18}H_{37}OSO_3Na$ and 20 parts of $Na_2SO_4$ are added to the filter cake, which contains 58 parts (95% of theory) of pure dyestuff, and the mixture is made up to a total weight of 420 parts with water and homogenized well by stirring. After spray-drying this paste, a red powder is obtained which has the composition: about 40% of dyestuff, 40% of emulsifier and 20% of $Na_2SO_4/NaCl$, and dyes, for example, polyester materials by the exhaustion process, with about 93% exhaustion of the bath, in clear red shades with outstanding fastness properties and can also be employed for printing processes with similarly good results.

The 5-nitro-2-amino-benzoic acid methyltetraglycol ester employed in this example can be obtained, for example, by reacting methylglycol with 3 equivalents of ethylene oxide in a closed vessel under alkaline catalysis at somewhat elevated temperature and reacting the resulting statistical mixture of methylpolyglycols, the average molecular weight of which corresponds to that of a methyltetraglycol, with one equivalent of 5-nitro-isatoic acid anhydride and catalytic amounts of alcoholate, decarboxylation to the corresponding ester taking place.

The 3-nitro-4-aminobenzoic acid polyglycol ester employed in the following examples can be obtained, for example, by esterifying 3-nitro-4-amino-benzoic acid with the mixture of alkylpolyglycols prepared as described above, in the presence of an acid catalyst, such as, for example, $H_2SO_4$, the water of reaction being distilled off.

The dyestuffs listed in the tables which follow are prepared analogously to the above examples and serve to illustrate the present invention.

TABLE 1

| Example No. | R | m | X | Position of the azo group relative to the ester group | Y | Colour shade |
|---|---|---|---|---|---|---|
| 5 | $CH_3$ | 2 | H | para | Phenyl | greenish-tinged yellow |
| 6 | $CH_3$ | 3 | H | " | " | greenish-tinged yellow |
| 7 | $CH_3$ | 6 | H | " | 3-Hydroxyphenyl | greenish-tinged yellow |
| 8 | $C_2H_5$ | 3 | H | " | $CH_2-CH_2-CN$ | greenish-tinged yellow |
| 9 | $C_2H_5$ | 5 | H | " | Phenyl | greenish-tinged yellow |
| 10 | n-$C_3H_7$ | 6 | H | " | " | greenish-tinged yellow |
| 11 | n-$C_4H_9$ | 3 | H | " | Methyl | greenish-tinged yellow |
| 12 | Cyclohexyl | 4 | H | " | Phenyl | greenish-tinged yellow |
| 13 | Phenyl | 3 | H | " | $C_2H_4OH$ | greenish-tinged yellow |
| 14 | 2-Ethylhexyl | 4 | H | " | Phenyl | greenish-tinged yellow |
| 15 | H | 4 | H | " | " | greenish-tinged yellow |
| 16 | $CH_3$ | 4 | $NO_2$ | " | " | yellow |
| 17 | $CH_3$ | 5 | $NO_2$ | " | " | " |

TABLE 1-continued

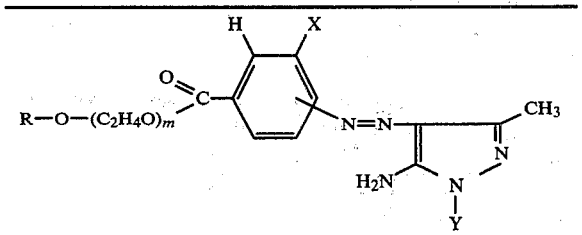

| Example No. | R | m | X | Position of the azo group relative to the ester group | Y | Colour shade |
|---|---|---|---|---|---|---|
| 18 | $C_2H_5$ | 4 | $NO_2$ | " | " | " |
| 19 | $i-C_3H_7$ | 4 | $NO_2$ | " | " | " |
| 20 | $n-C_4H_9$ | 3 | $NO_2$ | " | Methyl | " |
| 21 | $n-C_4H_9$ | 6 | $NO_2$ | " | Phenyl | " |
| 22 | $CH_3$ | 4 | H | ortho | " | greenish-tinged yellow |
| 23 | $C_2H_5$ | 5 | H | " | " | greenish-tinged yellow |
| 24 | $n-C_4H_9$ | 3 | H | " | " | greenish-tinged yellow |
| 25 | Benzyl | 4 | H | " | " | greenish-tinged yellow |

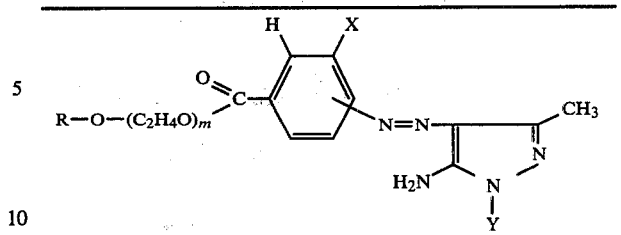

| Example No. | R | m | X | Position of the azo group relative to the ester group | Y | Colour shade |
|---|---|---|---|---|---|---|
| 26 | $CH_3$ | 3 | $NO_2$ | " | " | reddish-tinged yellow |
| 27 | $CH_3$ | 5 | $NO_2$ | " | " | reddish-tinged yellow |
| 28 | $C_2H_5$ | 4 | $NO_2$ | " | " | reddish-tinged yellow |
| 29 | $n-C_4H_9$ | 3 | $NO_2$ | " | " | reddish-tinged yellow |

TABLE 2

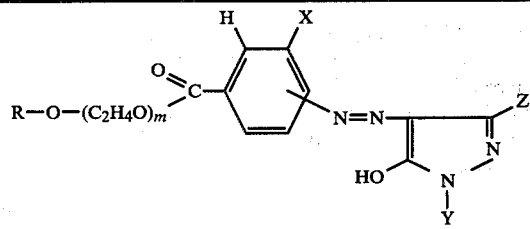

| Example No. | R | m | X | Position of the azo group relative to the ester group | Y | Z | Colour shade |
|---|---|---|---|---|---|---|---|
| 30 | $CH_3$ | 3 | H | para | Phenyl | $CH_3$ | greenish-tinged yellow |
| 31 | $CH_3$ | 4 | H | " | " | $—COOCH_3$ | greenish-tinged yellow |
| 32 | $CH_3$ | 6 | H | " | " | $—CONHCH_3$ | greenish-tinged yellow |
| 33 | $C_2H_5$ | 3 | H | " | " | $CH_3$ | greenish-tinged yellow |
| 34 | $C_2H_5$ | 5 | H | " | $CH_3$ | $CH_3$ | greenish-tinged yellow |
| 36 | $n-C_3H_7$ | 6 | H | " | Phenyl | $—COOC_2H_5$ | greenish-tinged yellow |
| 37 | $n-C_4H_9$ | 3 | H | " | " | $CH_3$ | greenish-tinged yellow |
| 38 | Cyclohexyl | 4 | H | " | " | $CH_3$ | greenish-tinged yellow |
| 39 | Phenyl | 3 | H | " | " | $CH_3$ | greenish-tinged yellow |
| 40 | 2-Ethyl-hexyl | 4 | H | " | " | $CH_3$ | greenish-tinged yellow |
| 41 | H | 4 | H | " | " | $—COOCH_3$ | greenish-tinged yellow |
| 42 | H | 4 | H | " | " | $CH_3$ | greenish-tinged yellow |
| 43 | $CH_3$ | 4 | $NO_2$ | " | " | $CH_3$ | yellow |
| 44 | $CH_3$ | 5 | $NO_2$ | " | " | $COOC_2H_5$ | " |
| 45 | $C_2H_5$ | 4 | $NO_2$ | " | " | $CH_3$ | " |
| 46 | $i-C_3H_7$ | 4 | $NO_2$ | " | " | $CH_3$ | " |

TABLE 2-continued

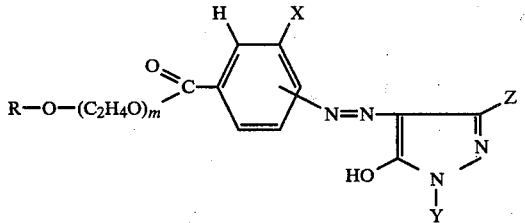

| Example No. | R | m | X | Position of the azo group relative to the ester group | Y | Z | Colour shade |
|---|---|---|---|---|---|---|---|
| 47 | n-C$_4$H$_9$ | 3 | NO$_2$ | " | CH$_3$ | CH$_3$ | " |
| 48 | n-C$_4$H$_9$ | 6 | NO$_2$ | " | Phenyl | CONHCH$_3$ | " |
| 49 | CH$_3$ | 4 | H | " | C$_2$H$_4$CN | CH$_3$ | greenish-tinged yellow |
| 50 | C$_2$H$_5$ | 5 | H | ortho | Phenyl | CH$_3$ | greenish-tinged yellow |
| 51 | n-C$_4$H$_9$ | 3 | H | " | " | COOCH$_3$ | greenish-tinged yellow |
| 52 | Benzyl | 4 | H | " | " | CH$_3$ | greenish-tinged yellow |
| 53 | C$_2$H$_5$ | 4 | H | " | C$_2$H$_4$—CN | CH$_3$ | greenish-tinged yellow |
| 54 | CH$_3$ | 4 | H | " | C$_2$H$_4$—CN | CH$_3$ | greenish-tinged yellow |
| 55 | CH$_3$ | 3 | NO$_2$ | " | Methyl | CH$_3$ | yellow |
| 56 | CH$_3$ | 5 | NO$_2$ | " | Phenyl | CH$_3$ | " |
| 57 | C$_2$H$_5$ | 4 | NO$_2$ | " | " | CH$_3$ | " |
| 58 | n-C$_4$H$_9$ | 3 | NO$_2$ | " | " | COOC$_2$H$_5$ | " |
| 59 | CH$_3$ | 5 | H | para | " | COOH | greenish-tinged yellow |
| 60 | CH$_3$ | 5 | H | ortho | " | COOH | greenish-tinged yellow |

TABLE 3

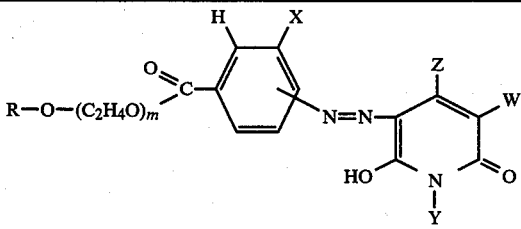

| Example No. | R | m | X | Position of the azo group relative to the ester group | Z | Y | W | Colour shade |
|---|---|---|---|---|---|---|---|---|
| 61 | CH$_3$ | 3 | H | para | H | CH$_3$ | CN | yellow |
| 62 | CH$_3$ | 4 | H | " | CH$_3$ | CH$_3$ | CN | " |
| 63 | CH$_3$ | 6 | H | " | CH$_3$ | C$_2$H$_5$ | CONHC$_2$H$_5$ | " |
| 64 | C$_2$H$_5$ | 3 | H | " | CH$_3$ | CH$_3$ | CN | " |
| 65 | C$_2$H$_5$ | 5 | H | " | CH$_3$ | C$_2$H$_5$ | CN | " |
| 66 | n-C$_3$H$_7$ | 6 | H | " | CH$_3$ | CH$_3$ | CN | " |
| 67 | n-C$_4$H$_9$ | 3 | H | " | H | CH$_3$ | CN | " |
| 68 | Cyclohexyl | 4 | H | " | CH$_3$ | CH$_3$ | CN | " |
| 69 | Phenyl | 3 | H | " | CH$_3$ | CH$_3$ | CN | " |
| 70 | 2-Ethyl-hexyl | 4 | H | " | CH$_3$ | CH$_3$ | CN | " |
| 71 | H | 4 | H | " | CH$_3$ | CH$_3$ | CN | " |
| 72 | Benzyl | 5 | H | " | CH$_3$ | CH$_3$ | CN | " |
| 73 | CH$_3$ | 4 | NO$_2$ | " | CH$_3$ | CH$_3$ | CN | reddish-tinged yellow |
| 74 | CH$_3$ | 5 | NO$_2$ | " | CH$_3$ | CH$_3$ | CN | reddish-tinged yellow |
| 75 | C$_2$H$_5$ | 4 | NO$_2$ | " | CH$_3$ | CH$_3$ | CN | reddish-tinged yellow |
| 76 | i-C$_3$H$_7$ | 4 | NO$_2$ | " | CH$_3$ | CH$_3$ | CN | reddish-tinged yellow |
| 77 | n-C$_4$H$_9$ | 3 | NO$_2$ | " | CH$_3$ | CH$_3$ | CN | reddish-tinged yellow |
| 78 | n-C$_4$H$_9$ | 6 | NO$_2$ | " | CH$_3$ | CH$_3$ | CN | reddish-tinged yellow |
| 79 | CH$_3$ | 4 | H | ortho | CH$_3$ | CH$_3$ | CN | yellow |
| 80 | C$_2$H$_5$ | 5 | H | " | CH$_3$ | C$_2$H$_5$ | CONHC$_2$H$_5$ | " |

TABLE 3-continued

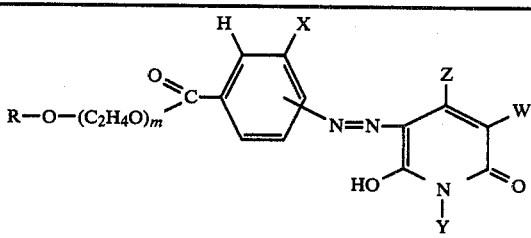

| Example No. | R | m | X | Position of the azo group relative to the ester group | Z | Y | W | Colour shade |
|---|---|---|---|---|---|---|---|---|
| 81 | n-C$_4$H$_9$ | 3 | H | " | CH$_3$ | CH$_3$ | CN | " |
| 82 | Benzyl | 4 | H | " | CH$_3$ | CH$_3$ | CN | " |
| 83 | CH$_3$ | 3 | NO$_2$ | " | CH$_3$ | CH$_3$ | CN | reddish-tinged yellow |
| 84 | CH$_3$ | 5 | NO$_2$ | " | CH$_3$ | CH$_3$ | CN | reddish-tinged yellow |
| 85 | C$_2$H$_5$ | 4 | NO$_2$ | " | CH$_3$ | CH$_3$ | CN | reddish-tinged yellow |
| 86 | n-C$_4$H$_9$ | 3 | NO$_2$ | " | CH$_3$ | CH$_3$ | CN | reddish-tinged yellow |

TABLE 4

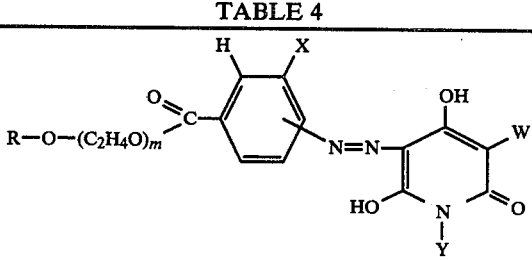

| Example No. | R | m | X | Position of the azo group relative to the ester group | W | Y | Colour shade |
|---|---|---|---|---|---|---|---|
| 87 | CH$_3$ | 3 | H | para | CONHCH$_3$ | CH$_3$ | greenish-tinged yellow |
| 88 | CH$_3$ | 4 | H | " | CONHC$_2$H$_5$ | C$_2$H$_5$ | greenish-tinged yellow |
| 89 | CH$_3$ | 6 | H | " | CONHCH$_3$ | CH$_3$ | greenish-tinged yellow |
| 90 | C$_2$H$_5$ | 3 | H | " | " | CH$_3$ | greenish-tinged yellow |
| 91 | C$_2$H$_5$ | 5 | H | " | " | CH$_3$ | greenish-tinged yellow |
| 92 | n-C$_3$H$_7$ | 6 | H | " | " | CH$_3$ | greenish-tinged yellow |
| 93 | n-C$_4$H$_9$ | 3 | H | " | " | CH$_3$ | greenish-tinged yellow |
| 94 | Cyclohexyl | 4 | H | " | " | CH$_3$ | greenish-tinged yellow |
| 95 | Phenyl | 3 | H | " | " | CH$_3$ | greenish-tinged yellow |
| 96 | 2-Ethylhexyl | 4 | H | " | " | CH$_3$ | greenish-tinged yellow |
| 97 | H | 4 | H | " | " | CH$_3$ | greenish-tinged yellow |
| 98 | CH$_3$ | 4 | H | " | CN | CH$_3$ | greenish-tinged yellow |
| 99 | CH$_3$ | 4 | NO$_2$ | " | CONHCH$_3$ | CH$_3$ | yellow |
| 100 | CH$_3$ | 5 | NO$_2$ | " | CONHCH$_3$ | CH$_3$ | " |
| 101 | C$_2$H$_5$ | 4 | NO$_2$ | " | " | CH$_3$ | " |
| 102 | i-C$_3$H$_7$ | 4 | NO$_2$ | " | " | CH$_3$ | " |
| 103 | n-C$_4$H$_9$ | 3 | NO$_2$ | " | CONHC$_2$H$_5$ | C$_2$H$_5$ | " |
| 104 | n-C$_4$H$_9$ | 6 | NO$_2$ | " | CONHCH$_3$ | CH$_3$ | " |
| 105 | CH$_3$ | 4 | H | ortho | " | CH$_3$ | greenish-tinged yellow |
| 106 | C$_2$H$_5$ | 5 | H | " | " | CH$_3$ | " |
| 107 | n-C$_4$H$_9$ | 3 | H | " | " | CH$_3$ | " |
| 108 | Benzyl | 4 | H | " | " | CH$_3$ | " |
| 109 | CH$_3$ | 3 | NO$_2$ | " | " | CH$_3$ | reddish-tinged yellow |
| 110 | CH$_3$ | 5 | NO$_2$ | " | " | CH$_3$ | " |
| 111 | C$_2$H$_5$ | 4 | NO$_2$ | " | " | CH$_3$ | " |

TABLE 4-continued

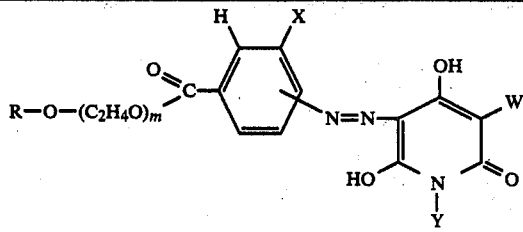

| Example No. | R | m | X | Position of the azo group relative to the ester group | W | Y | Colour shade |
|---|---|---|---|---|---|---|---|
| 112 | n-$C_4H_9$ | 3 | $NO_2$ | " | " | $CH_3$ | " |

TABLE 5

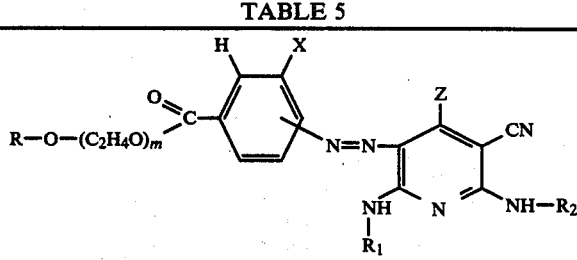

| Example No. | R | m | X | Position of the azo group relative to the ester group | Z | $R_1$ | $R_2$ | Colour shade |
|---|---|---|---|---|---|---|---|---|
| 113 | $CH_3$ | 3 | H | para | $CH_3$ | $C_2H_4$—$OCH_3$ | $C_2H_4$—$OCH_3$ | yellow |
| 114 | $CH_3$ | 4 | H | " | H | " | " | " |
| 115 | $CH_3$ | 6 | H | " | $CH_3$ | $C_2H_4OH$ | $C_3H_6$—$OCH_3$ | " |
| 116 | $C_2H_5$ | 3 | H | " | $CH_3$ | $C_4H_9$ | $C_4H_9$ | " |
| 117 | $C_2H_5$ | 5 | H | " | $CH_3$ | $CH_3$ | $CH_2$—$C_6H_5$ | " |
| 118 | n-$C_3H_7$ | 6 | H | " | $CH_3$ | $C_3H_6$—$OC_2H_5$ | $C_3H_6$—$OC_2H_5$ | " |
| 119 | n-$C_4H_9$ | 3 | H | " | $CH_3$ | $C_2H_4OH$ | $C_2H_4OH$ | " |
| 120 | Cyclohexyl | 4 | H | " | $CH_3$ | $CH_3$ | $CH_3$ | " |
| 121 | Phenyl | 3 | H | " | $CH_3$ | $C_3H_7$ | $C_2H_4$—$OCH_3$ | " |
| 122 | 2-Ethylhexyl | 4 | H | " | $CH_3$ | $C_2H_4$—$OCH_3$ | $C_2H_4$—$OCH_3$ | " |
| 123 | H | 4 | H | " | $CH_3$ | $C_2H_4$—$OCH_3$ | $C_2H_4$—$OCH_3$ | " |
| 124 | $CH_3$ | 4 | $NO_2$ | " | $CH_3$ | $C_2H_4$—$OCH_3$ | $C_2H_4$—$OCH_3$ | orange |
| 125 | $CH_3$ | 5 | $NO_2$ | " | H | " | " | " |
| 126 | $C_2H_5$ | 4 | $NO_2$ | " | $CH_3$ | $C_4H_9$ | $C_4H_9$ | " |
| 127 | i-$C_3H_7$ | 4 | $NO_2$ | " | $CH_3$ | $C_2H_4$—$OCH_3$ | $CH_2$—$C_6H_5$ | " |
| 128 | n-$C_4H_9$ | 3 | $NO_2$ | " | $CH_3$ | $C_2H_4$—$OH$ | $C_3H_6$—$OCH_3$ | " |
| 129 | n-$C_4H_9$ | 6 | $NO_2$ | " | $CH_3$ | $CH_3$ | $C_3H_6$—$OCH_3$ | " |
| 130 | $CH_3$ | 4 | H | ortho | $CH_3$ | $C_3H_6$—$OCH_3$ | $C_3H_6$—$OCH_3$ | yellow |
| 131 | $C_2H_5$ | 5 | H | " | $CH_3$ | $C_3H_7$ | $C_3H_7$ | " |
| 132 | n-$C_4H_9$ | 3 | H | " | $CH_3$ | $C_2H_4$—$OH$ | $C_2H_4$—$OCH_3$ | " |
| 133 | Benzyl | 4 | H | " | $CH_3$ | $C_2H_4$—$OCH_3$ | $C_2H_4$—$OCH_3$ | " |
| 134 | $CH_3$ | 3 | $NO_2$ | " | $CH_3$ | $C_2H_4$—$OCH_3$ | $C_2H_4$—$OCH_3$ | red |
| 135 | $CH_3$ | 5 | $NO_2$ | " | $CH_3$ | $C_4H_9$ | $C_4H_9$ | red |
| 136 | $C_2H_5$ | 4 | $NO_2$ | " | $CH_3$ | $C_3H_6$—$OCH_3$ | $C_3H_6$—$OCH_3$ | red |
| 137 | n-$C_4H_9$ | 3 | $NO_2$ | " | $CH_3$ | $C_2H_4$—$OCH_3$ | $CH_2$—$C_6H_5$ | red |

TABLE 6

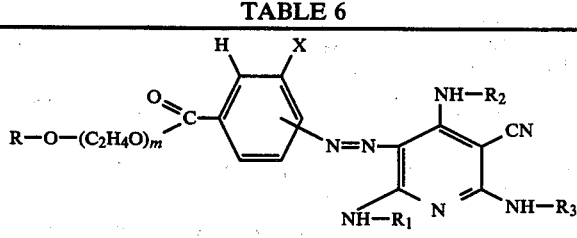

| Example No. | R | m | X | Position of the azo group relative to the ester group | $R_1$ | $R_2$ | $R_3$ | Colour shade |
|---|---|---|---|---|---|---|---|---|
| 138 | $CH_3$ | 3 | H | para | H | H | $C_3H_6$—$OCH_3$ | yellow |
| 139 | $CH_3$ | 4 | H | " | $CH_3$ | $CH_3$ | $CH_2$—$C_6H_5$ | " |
| 140 | $CH_3$ | 6 | H | " | $CH_3$ | $CH_3$ | $C_4H_9$ | " |

TABLE 6-continued

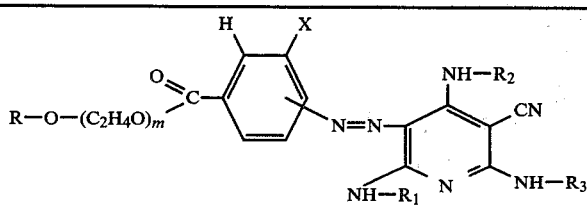

| Example No. | R | m | X | Position of the azo group relative to the ester group | $R_1$ | $R_2$ | $R_3$ | Colour shade |
|---|---|---|---|---|---|---|---|---|
| 141 | $C_2H_5$ | 3 | H | " | $C_2H_4$—$OCH_3$ | $C_2H_4$—$OCH_3$ | $C_2H_4$—$OCH_3$ | " |
| 142 | $C_2H_5$ | 5 | H | " | H | H | $CH_2$—$C_6H_5$ | " |
| 143 | n-$C_3H_7$ | 6 | H | " | $CH_3$ | $CH_3$ | $C_4H_9$ | " |
| 144 | n-$C_4H_9$ | 3 | H | " | $C_2H_4$—$OCH_3$ | $C_2H_4$—$OCH_3$ | $CH_2$—$C_6H_5$ | " |
| 145 | Cyclohexyl | 4 | H | " | $CH_3$ | $CH_3$ | $C_2H_4$—$OCH_3$ | " |
| 146 | Phenyl | 3 | H | " | H | H | $C_2H_4$—$OCH_3$ | " |
| 147 | 2-Ethyl-hexyl | 4 | H | " | $CH_3$ | $CH_3$ | $C_3H_6$—$OCH_3$ | " |
| 148 | H | 4 | H | " | $CH_3$ | $CH_3$ | $C_3H_6$—$OC_2H_5$ | " |
| 149 | $CH_3$ | 4 | $NO_2$ | " | $CH_3$ | $CH_3$ | $C_2H_4$—$OCH_3$ | orange |
| 150 | $CH_3$ | 5 | $NO_2$ | " | H | H | $C_4H_9$ | " |
| 151 | $C_2H_5$ | 4 | $NO_2$ | " | $C_2H_4$—$OCH_3$ | $C_2H_4$—$OCH_3$ | $C_3H_6$—$OCH_3$ | " |
| 152 | i-$C_3H_7$ | 4 | $NO_2$ | " | $CH_3$ | $CH_3$ | $CH_2$—$C_6H_5$ | " |
| 153 | n-$C_4H_9$ | 3 | $NO_2$ | " | $CH_3$ | $CH_3$ | $C_2H_4$—$OCH_3$ | " |
| 154 | n-$C_4H_9$ | 6 | $NO_2$ | " | $C_2H_4$—$OCH_3$ | $C_2H_4$—$OCH_3$ | $C_3H_6$—$OC_2H_5$ | " |
| 155 | $CH_3$ | 4 | H | ortho | $CH_3$ | $CH_3$ | $C_2H_4$—$OCH_3$ | yellow |
| 156 | $C_2H_5$ | 5 | H | " | $CH_3$ | $CH_3$ | $C_4H_9$ | " |
| 157 | n-$C_4H_9$ | 3 | H | " | H | H | $C_2H_4$—$OCH_3$ | " |
| 158 | Benzyl | 4 | H | " | $CH_3$ | $CH_3$ | $C_4H_9$ | " |
| 159 | $CH_3$ | 3 | $NO_2$ | " | $C_2H_4$—$OCH_3$ | $C_2H_4$—$OCH_3$ | $C_3H_6$—$OCH_3$ | red |
| 160 | $CH_3$ | 5 | $NO_2$ | " | $CH_3$ | $CH_3$ | $C_2H_4$—$OCH_3$ | " |
| 161 | $C_2H_5$ | 4 | $NO_2$ | " | $CH_3$ | $CH_3$ | $CH_2$—$C_6H_5$ | " |
| 162 | n-$C_4H_9$ | 3 | $NO_2$ | " | $C_2H_4$—$OCH_3$ | $C_2H_4$—$OCH_3$ | $C_2H_4$—$OCH_3$ | " |

TABLE 7

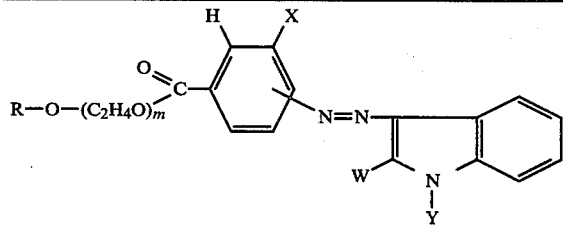
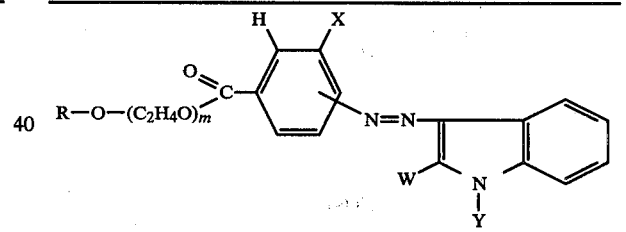

| Example No. | R | m | X | Position of the azo group relative to the ester group | W | Y | Colour shade |
|---|---|---|---|---|---|---|---|
| 163 | $CH_3$ | 3 | H | para | Phenyl | H | golden yellow |
| 164 | $CH_3$ | 4 | H | " | $CH_3$ | H | golden yellow |
| 165 | $CH_3$ | 6 | H | " | Phenyl | $CH_3$ | reddish-tinged yellow |
| 166 | $C_2H_5$ | 3 | H | " | " | $CH_3$ | reddish-tinged yellow |
| 167 | $C_2H_5$ | 5 | H | " | " | H | golden yellow |
| 168 | n-$C_3H_7$ | 6 | H | " | " | H | golden yellow |
| 169 | n-$C_4H_9$ | 3 | H | " | $CH_3$ | $CH_3$ | golden yellow |
| 170 | Cyclohexyl | 4 | H | " | Phenyl | H | golden yellow |
| 171 | Phenyl | 3 | H | " | " | H | golden yellow |
| 172 | 2-Ethyl-hexyl | 4 | H | " | " | H | golden yellow |
| 173 | H | 4 | H | " | " | $CH_3$ | golden yellow |
| 174 | $CH_3$ | 4 | $NO_2$ | " | " | H | reddish-tinged orange |
| 175 | $CH_3$ | 5 | $NO_2$ | " | " | $CH_3$ | reddish-tinged orange |
| 176 | $C_2H_5$ | 4 | $NO_2$ | " | $CH_3$ | H | reddish-tinged orange |
| 177 | i-$C_3H_7$ | 4 | $NO_2$ | " | " | Phenyl H | reddish-tinged orange |
| 178 | n-$C_4H_9$ | 3 | $NO_2$ | " | " | H | reddish-tinged orange |
| 179 | n-$C_4H_9$ | 6 | $NO_2$ | " | " | $CH_3$ | reddish-tinged orange |
| 180 | $CH_3$ | 4 | H | ortho | $CH_3$ | H | yellow |
| 181 | $C_2H_5$ | 5 | H | " | Phenyl | H | " |
| 182 | n-$C_4H_9$ | 3 | H | " | " | H | " |
| 183 | Benzyl | 4 | H | " | " | H | " |
| 184 | $CH_3$ | 3 | $NO_2$ | " | $CH_3$ | H | red-orange |

We claim:
1. An azo dyestuff of the formula

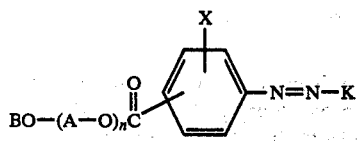

wherein
X denotes hydrogen, nitro or COOR$_1$,
B denotes R or acyl,
R denotes hydrogen, alkyl, cycloalkyl, alkenyl, aryl or aralkyl,
R$_1$ denotes alkyl or cycloalkyl,
A denotes alkylene.
n denotes the numbers 3–8 and
K denotes a coupling component from the series

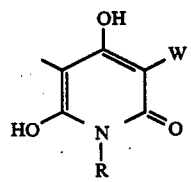   (a)

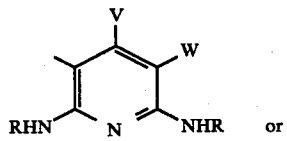   (b)

or

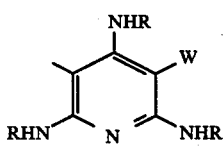   (c)

R—independently of one another—has the abovementioned meaning,
V represents hydrogen or methyl and
W represents CN, COOR or CONHR, and
the alkyl, cycloalkyl, alkenyl, aryl, alkylene and acyl radicals mentioned above in any context can contain further non-ionic substituents customary in azo chemistry or can contain the radical COOH.

2. An azo dyestuff according to claim 1, of the formula

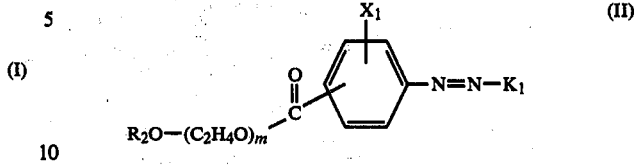   (II)

wherein
m denotes the numbers 3–6,
R$_2$ denotes hydrogen or C$_1$–C$_4$-alkyl,
X$_1$ denotes hydrogen or —NO$_2$ and
K$_1$ denotes a coupling component from the series

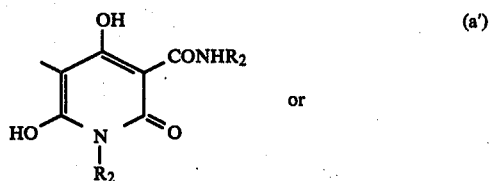   (a')

or

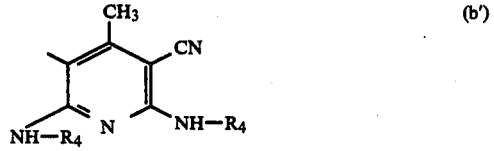   (b')

and R$_4$ denotes R$_2$ or C$_1$–C$_4$-alkyl which is optionally substituted by OH, C$_1$–C$_4$-alkoxy, phenyl or phenoxy.

3. An azo dyestuff according to claim 2, of the formula

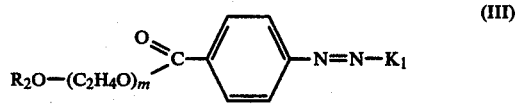   (III)

4. An azo dyestuff according to claim 1, wherein K represents the radical

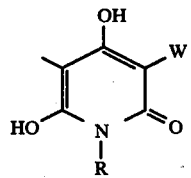

5. An azo dyestuff according to claim 1, of the formula

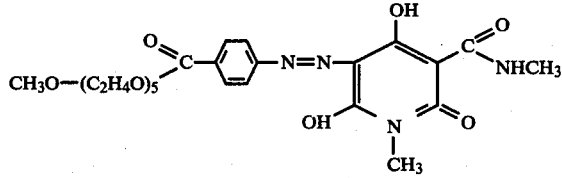

6. An azo dyestuff according to claim 1, of the formula

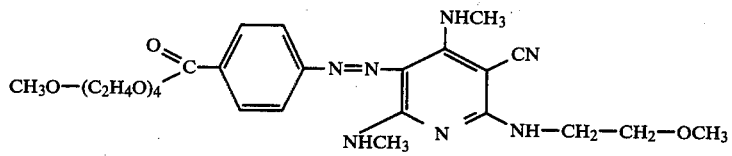

7. A dyestuff mixture consisting of at least 2 dyestuffs of the formula indicated in claim 1, wherein the individual dyestuffs differ from one another at least in respect of the number n.

8. A dyestuff mixture according to claim 7, obtained by a conventional diazotisation/coupling reaction, wherein the diazo components employed are those which are prepared using the statistical mixture which are obtained from the oxalkylation of compounds of the formula B′-OH, wherein B′ represents alkyl, alkenyl, cycloalkyl, aryl, aralkyl or acyl.

* * * * *